United States Patent [19]

Kurokawa et al.

[11] Patent Number: 4,650,777
[45] Date of Patent: Mar. 17, 1987

[54] METHOD FOR PREPARING ALUMINUM NITRIDE CERAMICS HAVING SUPERIOR THERMAL CONDUCTIVITIES

[75] Inventors: Yasuhiro Kurokawa; Kazuaki Utsumi; Hideo Takamizawa, all of Tokyo, Japan

[73] Assignee: NEC Corporation, Tokyo, Japan

[21] Appl. No.: 693,105

[22] Filed: Jan. 22, 1985

[30] Foreign Application Priority Data

Jan. 19, 1984 [JP]  Japan ................................. 59-7485

[51] Int. Cl.⁴ ............................................. C04B 35/58
[52] U.S. Cl. ....................................... 501/96; 501/98
[58] Field of Search ..................................... 501/96, 98

[56] References Cited

U.S. PATENT DOCUMENTS

| 4,435,513 | 3/1984 | Komeya et al. | 501/98 X |
| 4,533,645 | 8/1985 | Huseby et al. | 501/98 X |
| 4,540,673 | 9/1985 | Takeda et al. | 501/96 |
| 4,578,234 | 3/1986 | Huseby et al. | 501/98 |

Primary Examiner—William R. Dixon, Jr.
Assistant Examiner—Steven Capella
Attorney, Agent, or Firm—Burns, Doane, Swecker & Mathis

[57] ABSTRACT

Aluminum nitride ceramics is prepared by mixing acetylide of calcium, strontium, barium or other material with raw aluminum nitride powder with a content between 0.02 and 10 wt %, forming the mixture into a predetermined shape and sintering the formed body in a non-oxidizing atmosphere such as nitrogen gas by pressureless and/or pressure sintering technique.

12 Claims, 3 Drawing Figures

METHOD FOR PREPARING ALUMINUM NITRIDE CERAMICS HAVING SUPERIOR THERMAL CONDUCTIVITIES

BACKGROUND OF THE INVENTION

1. Field of the Invention

This invention relates to a method for preparing aluminum nitride (AlN) ceramics, especially for preparing AlN ceramics having high thermal conductivities.

2. Description of the Prior Art

With the advances of high integration density and high output power of the recent semiconductor integrated circuits, the value of power consumption per unit area of a semiconductor chip is increasing. Unless the generated heat is sufficiently radiated, the integrated circuit produces a maloperation or eventully breaks down. The insulating substrates to mount integrated circuit chips, which have larger thermal conductivities have been demanded.

Heretofore, alumina ceramics has been widely used as the materials for the insulating substrates to mount semiconductor chips. However, as the power dissipated in a semiconductor integrated circuit increases, the thermal conductivity becomes to be insufficient. The insulating substrate having more improved thermal conductivity is still demanded. For the material of such insulating substrate, a large electrical resistance, a thermal expansion coefficient close to that of silicon and a high mechanical strength are required in addition to the high thermal conductivity.

As the material satisfying these requirements, the use of aluminum nitride ceramics has recently proposed. The aluminum nitride ceramics has a thermal expansion coefficient of about $4.3 \times 10^{-6}/°C$. (average from room temperature to 400° C.) which is smaller than the thermal expansion coefficient, about $7 \times 10^{-6}/°C$., of the alumina ceramics and which is close to the thermal expansion coefficient, 3.5 to $4.0 \times 10^{-6}/°C$., of silicon. The mechanical strength of the aluminum nitride ceramics is about 50 Kg/mm$^2$ of a flexural strength and is strong compared to the alumina ceramics having that of 20 to 30 Kg/mm$^2$.

The aluminum nitride ceramics is prepared by sintering aluminum nitride powder. However, since the aluminum nitride is covalent bond material, it is difficult to obtain densified ceramics. To sinter the aluminum nitride powder, appropriate sintering additives are used. Japanese published unexamined patent applications (TOKKAISHO) Nos. 54-100410, 50-23411 and 58-55377 use oxides such as calcium oxide (CaO), barium oxide (BaO) and strontium oxide as the sintering additives. However, those oxides do not cause reducing reaction. According to the findings of the present inventors, oxygen contained in the aluminum nitride powder deteriorates the thermal conductivity of the resultant aluminum nitride ceramics, and the use of oxides cannot remove the oxygen content to restrict improving the thermal conductivity. For example, when calcium oxide (CaO) is added to aluminum nitride powder with a content of 0.6 wt % and the mixture is sintered under a sintering temperature of about 1800° C. for two hours, the obtained aluminum nitride ceramics has a thermal conductivity between 40 to 50 W/mK. The best value of the thermal conductivity reported in the above-mentioned Japanese published unexamined patent applications were at most 70 W/mK.

SUMMARY OF THE INVENTION

The object of the present invention is to provide a method for preparing aluminum nitride ceramics having improved thermal conductivities.

The method for preparing aluminum nitride ceramics according to the present invention comprises steps of mixing aluminum nitride powder with 0.02 to 10 wt % of at least one acetylide, and sintering the mixture in non-oxidizing atmosphere. Such acetylide is preferably selected from acetylides of calcium (Ca), strontium (Sr), barium (Ba), sodium (Na) potassium (K), rubidium (Rb), cesium (Cs), copper (Cu), silver (Ag), magnesium (Mg), cadmium (Cd), mercury (Hg), zinc (Zn), aluminum (Al) and cerium (Ce).

According to the present invention, the sintering additive of a cetylide reacts with oxygen contained in the aluminum nitride powder during the sintering process to remove oxygen from obtained aluminum nitride ceramics. As a result, the content of oxygen in the aluminum nitride ceramics which deteriorates the thermal conductivity becomes very small. The prepared aluminum nitride ceramics can have a thermal conductivity larger than 70 W/mK.

BRIEF DESCRIPTION OF THE DRAWINGS

The above and further objects, features and advantages of the present invention will become more apparent from the following detailed description of embodiments taken in conjunction with the accompanying drawings, wherein.

DESCRIPTION OF THE PREFERRED EMBODIMENTS

Figure 1:
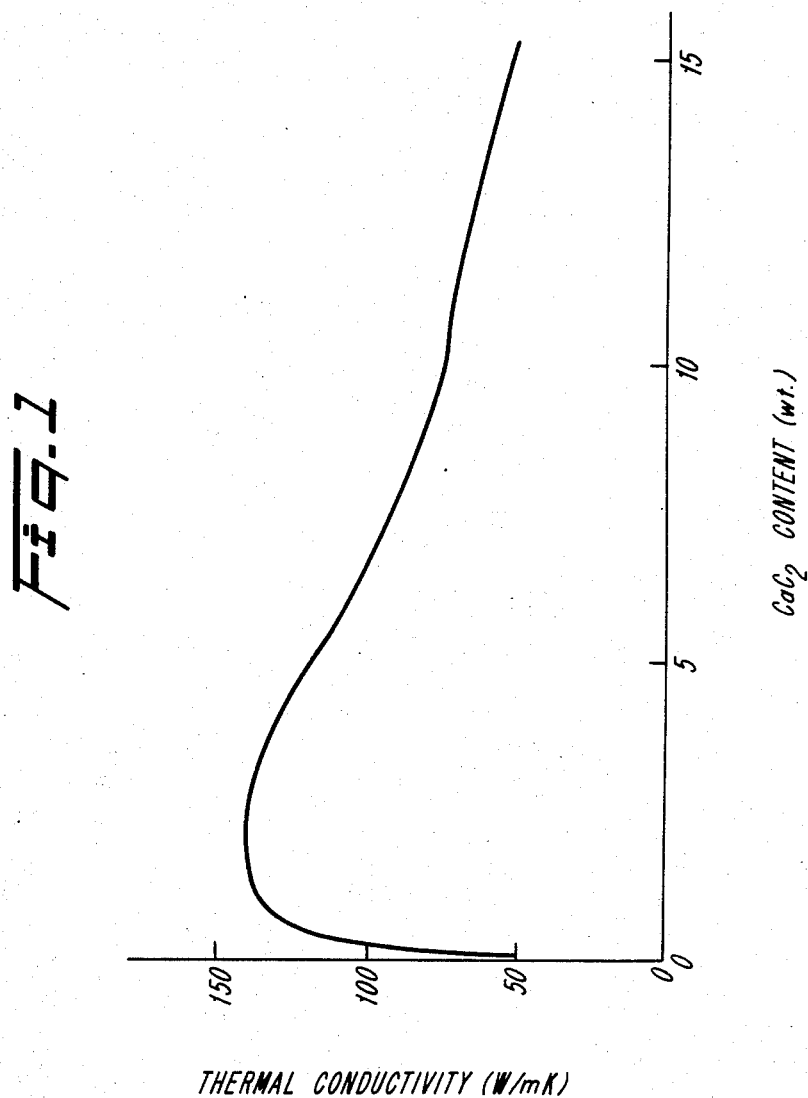
FIG. 1 is a graph showing a relationship between a content of $CaC_2$ as a sintering additive and a thermal conductivity of prepared AlN ceramics.

The raw aluminum nitride of high purity is used. Although the purity higher than 98% is preferable, it is possible to use aluminum nitride having a purity of 95 to 98%. It is better to use powder of the raw aluminum nitride having the particle size smaller than 10 $\mu$m, preferably smaller than 2 $\mu$m. The acetylides to be used in the present invention as the sintering additive are of Ca, Sr, Ba, Na, K, Rb, Cs, Cu, Ag, Mg, Cd, Hg, Zn, Al and Ce. The acetylides of Ca, Sr and Ba are preferable. By the use of at least one of the acetylides with content between 0.02 and 10 wt %, the thermal conductivity of the prepared aluminum nitride ceramics is greatly improved. The acetylides actively react with oxygen contained in the raw aluminum nitride in a high temperature atomosphere, as a result of improving the thermal conductivity by reducing the content of oxygen in the prepared aluminum nitride ceramics. Here, the acetylides actively react with moisture, too. Therefore, the acetylides should be carefully mixed with the raw aluminum nitride. The solvent to be used to mix them should be non-water solvent. The atmosphere during the mixing process should be non-oxidizing such as nitrogen gas. The temperature should keep low.

The sintering is applied to the mixture in non-oxidizing atmosphere with a high temperature. If the sintering is done in an oxidizing atmosphere, the aluminum nitride is oxidized to lower both the density of prepared ceramics and the thermal conductivity. As the non-oxidizing atmosphere, nitrogen gas, helium gas, argon gas, carbon mono-oxide gas, hydrogen gas and vacuous atmosphere may be used. Among them, the use of nitrogen gas, argon gas, helium gas or vacuous atmosphere is convenient. The sintering temperature is between 1,500° and 2,000° C., and preferably between 1,600° and 1,900° C. The normal sintering (pressureless sintering) technique at normal pressure may be employed. The pressure sintering technique may also be employed. As the pressure sintering technique, two methods may be employed, the hot press sintering and HIP (Hot Isostatic Press) sintering. Especially, a very high thermal conductivity is obtained by the hot press sintering.

Several preferred embodiments will next be explained.

(Embodiment 1)

Several kinds of acetylides are mixed with aluminum nitride powder of particles having a mean diameter of two μm with a content of two wt %. The obtained mixtures are then formed with a pressure of 2,000 Kg/cm² at room temperature. The formed bodies are sintered under a nitrogen atmosphere in a sintering oven at 1,800° C. for two hours to obtain aluminum nitride ceramics. The thermal conductivities at room temperature of thus obtained aluminum nitride ceramics are shown in the table 1. The thermal conductivities equal to or higher than 80 w/mk are obtained at room temperature by adding several kinds of acetylides.

TABLE 1

| Sample No. | Acetylides | thermal conductivity (w/mk) |
| --- | --- | --- |
| 1. | $CaC_2$ (2 wt %) | 140 |
| 2. | $SrC_2$ (2 wt %) | 130 |
| 3. | $BaC_2$ (2 wt %) | 120 |
| 4. | $Na_2C_2$ (2 wt %) | 90 |
| 5. | $K_2C_2$ (2 wt %) | 80 |
| 6. | $Rb_2C_2$ (2 wt %) | 90 |
| 7. | $CsC_2$ (2 wt %) | 90 |
| 8. | $CuC_2$ (2 wt %) | 110 |
| 9. | $Ag_2C_2$ (2 wt %) | 110 |
| 10. | $MgC_2$ (2 wt %) | 100 |
| 11. | $CdC_2$ (2 wt %) | 80 |
| 12. | $HgC_2$ (2 wt %) | 80 |
| 13. | $ZnC_2$ (2 wt %) | 110 |
| 14. | $Al_2C_6$ (2 wt %) | 110 |
| 15. | $Ce_2C_6$ (2 wt %) | 90 |
| 16. | $CaC_2$ (1 wt %) + $SrC_2$ (1 wt %) | 140 |
| 17. | $CaC_2$ (1 wt %) + $BaC_2$ (1 wt %) | 130 |
| 18. | $SrC_2$ (1 wt %) + $BaC_2$ (1 wt %) | 120 |
| 19. | $CaC_2$ (1.5 wt %) + $Rb_2C_2$ (0.5 wt %) | 100 |
| 20. | $CaC_2$ (0.5 wt %) + $CuC_2$ (1.5 wt %) | 100 |
| 21. | $CaC_2$ (1 wt %) + $SrC_2$ (0.5 wt %) + $BaC_2$ (0.5 wt %) | 120 |
| 22. | $CaC_2$ (1 wt %) + $ZnC_2$ (0.5 wt %) + $MgC_2$ (0.5 wt %) | 110 |
| 23 | No additive | 30 |
| 24. | CaO (0.6 wt %) | 55 |

Note:
Samples 23 and 24 are data to be compared.

(Embodiment 2)

The acetylides of table 1 are mixed with aluminum nitride powder of particles having a mean diameter of two μm with different contents. The mixtures are formed with a pressure of 2,000 Kg/cm² at room temperature. Thus formed bodies are sintered in an oven of nitrogen gas atmosphere under conditions shown in table 2. The thermal conductivities of thus obtained aluminum nitride ceramics at room temperature are also shown in table 2. As apparent from table 2, the aluminum nitride ceramics having thermal conductivities equal to or higher than 60 W/mK at room temperature are obtained by adding acetylides.

TABLE 2

| Sample No. | Acetylide Kind | Acetylide Content (wt %) | Sintering Temperature (°C.) | Sintering Time (h) | Pressure at Hot Press Sintering (kg/cm²) | Relative Density (%) | Thermal Conductivity (w/mk) |
| --- | --- | --- | --- | --- | --- | --- | --- |
| 25 | $CaC_2$ | 0.02 | 1900 | 4 | 200 | 98 | 70 |
| 26 | $SrC_2$ | 0.01 | 1900 | 4 | 100 | 98 | 80 |
| 27 | $BaC_2$ | 0.5 | 1900 | 1 | 0 | 97 | 60 |
| 28 | $CaC_2$ | 1.0 | 1800 | 2 | 0 | 98 | 130 |
| 29 | $CaC_2$ | 1.0 | 1800 | 2 | 200 | 99 | 160 |
| 30 | $ZnC_2$ | 1.0 | 2000 | 2 | 100 | 98 | 90 |
| 31 | $Na_2C_2$ | 2.0 | 2000 | 2 | 0 | 96 | 80 |
| 32 | $K_2C_2$ | 4.0 | 2000 | 1 | 200 | 98 | 100 |
| 33 | $CsC_2$ | 7.0 | 1900 | 1 | 400 | 98 | 90 |
| 34 | $CaC_2$ | 10.0 | 1900 | 1 | 0 | 96 | 70 |
| 35 | $CaC_2$ | 10.0 | 1800 | 2 | 100 | 98 | 80 |
| 36 | $CaC_2$ $BaC_2$ | 2.0 2.0 | 1800 | 2 | 0 | 97 | 70 |
| 37 | $CaC_2$ $Na_2C_2$ | 3.0 4.0 | 1800 | 2 | 0 | 97 | 60 |
| 38 | $CaC_2$ $SrC_2$ $BaC_2$ | 2.0 2.0 2.0 | 1800 | 2 | 100 | 98 | 70 |
| 39 | $CaC_2$ $SrC_2$ $BaC_2$ | 4.0 4.0 2.0 | 1800 | 2 | 200 | 98 | 60 |

(Embodiment 3)

Calcium acetylide ($CaC_2$) is mixed with aluminum nitride powder of particles having a mean diameter of two μm with several contents from 0.01 to 15 wt %. The mixtures are then formed at room temperature with a pressure of 2,000 Kg/cm². Thus formed bodies are sintered in an oven of a nitrogen gas atmosphere at 1,800° C. for two hours to obtain aluminum nitride ceramics. The thermal conductivities of thus obtained aluminum nitride ceramics are shown in Table 3 and FIG. 1. By adding carbon acetylide with content between 0.02 and 10 wt %, the thermal conductivity becomes especially high and is equal to or higher than 70 W/mK. If the carbon acetylide is added with a content between 0.03 and 7 wt %, a thermal conductivity equal to or higher than 100 W/mK is obtained.

tivity of aluminum nitride ceramics become especially high and is equal to or higher than 60 W/mK. If the barium acetylide is added with a content between 0.05 and 4 wt %, a thermal conductivity equal to or higher than 100 W/mK is obtained.

TABLE 5

| Sample No. | Contents of $BaC_2$ in Mixture (wt %) | Sintering Temp. (°C.) | Sintering Time (Hours) | Pressure at Sintering (Kg/cm$^2$) | Relative Density (%) | Thermal Conductivity (W/mK) |
|---|---|---|---|---|---|---|
| 54 | 0.01 | 1,800 | 2 | 0 | 95 | 50 |
| 55 | 0.02 | 1,800 | 2 | 0 | 97 | 60 |
| 56 | 0.5 | 1,800 | 2 | 0 | 99 | 100 |
| 57 | 2.0 | 1,800 | 2 | 0 | 98 | 120 |
| 58 | 5.0 | 1,800 | 2 | 0 | 99 | 90 |
| 59 | 10.0 | 1,800 | 2 | 0 | 97 | 70 |
| 60 | 15.0 | 1,800 | 2 | 0 | 96 | 50 |

(Embodiment 6)

TABLE 3

| Sample No. | Contents of $CaC_2$ in Mixture (wt %) | Sintering Temp. (°C.) | Sintering Time (Hours) | Pressure at Sintering (Kg/cm$^2$) | Relative Density (%) | Thermal Conductivity (W/mK) |
|---|---|---|---|---|---|---|
| 40 | 0.01 | 1,800 | 2 | 0 | 95 | 50 |
| 41 | 0.02 | 1,800 | 2 | 0 | 97 | 70 |
| 42 | 0.5 | 1,800 | 2 | 0 | 99 | 120 |
| 43 | 1.0 | 1,800 | 2 | 0 | 98 | 130 |
| 44 | 5.0 | 1,800 | 2 | 0 | 99 | 120 |
| 45 | 10.0 | 1,800 | 2 | 0 | 97 | 70 |
| 46 | 15.0 | 1,800 | 2 | 0 | 96 | 50 |

(Embodiment 4)

Figure 2:
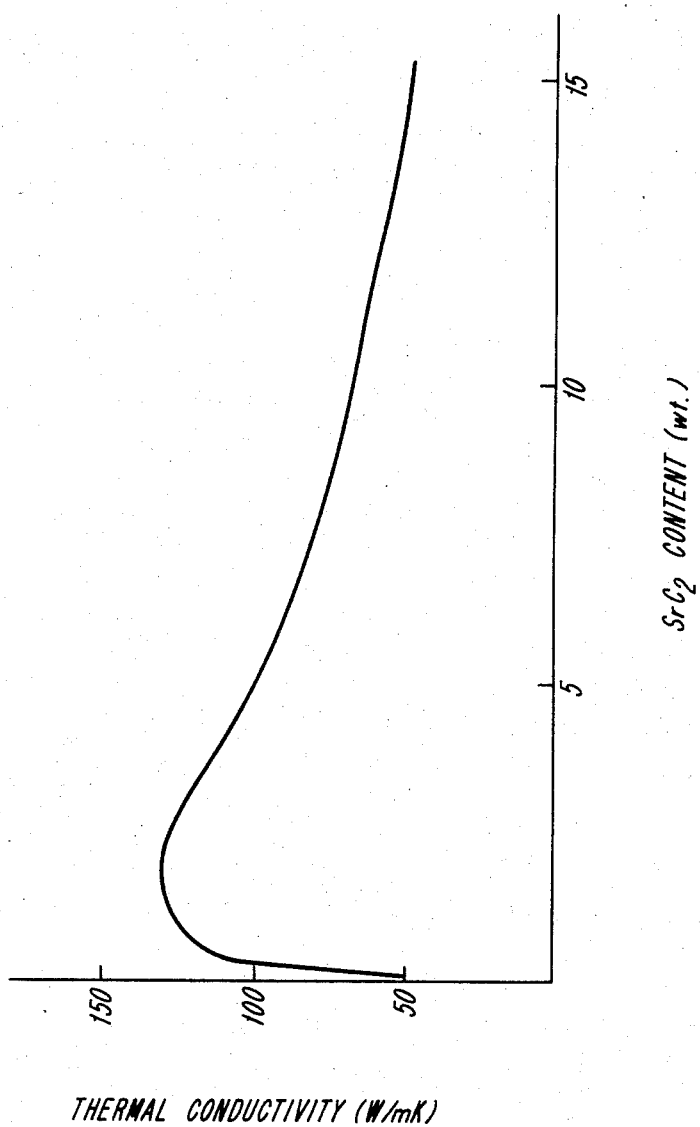
FIG. 2 is a graph showing a relationship between a contents of $SrC_2$ as a sintering additive and a thermal conductivity of prepared AlN ceramics.

Strontium acetylide (SrC$_2$) is mixed with aluminum nitride powder with contents from 0.01 to 15 wt %, similarly to the embodiment 3. Under the same conditions as the embodiment 3, the mixtures are formed and then the formed bodies are sintered to obtain aluminum nitride ceramics. The thermal conductivities at room temperature of obtained aluminum nitride ceramics are shown in Table 4 and FIG. 2. By adding strontium acetylide with contents between 0.02 and 10 wt %, the thermal conductivity of aluminum nitride ceramics becomes especially high and is equal to or higher than 60 W/mK. If the strontium acetylide is added with a content between 0.03 and 5 wt %, a thermal conductivity equal to or higher than 100 W/mK is obtained.

The aluminum nitride ceramics obtained in accordance with the embodiment 3 are further subjected to the HIP sintering at the sintering temperature of 1,700° C., with a pressure of 1,000 Kg/cm$^2$ for one hour. As a result, the terminal conductivities at room temperature of the aluminum nitride ceramics are improved to 150 W/mK.

(Embodiment 7)

Calcium acetylide (CaC$_2$) is mixed with aluminum nitride powder having a purity of 98% and a mean particle diameter of 1 μm with a content of 1 wt % by using a solvent of alcohol. The mixture is dried under a dried nitrogen atomospher with high temperature. The dried mixture is formed at room temperature with a pressure of 2,000 Kg/cm$^2$. The formed body is set in a

TABLE 4

| Sample No. | Contents of $SrC_2$ in Mixture (wt %) | Sintering Temp. (°C.) | Sintering Time (Hours) | Pressure at Sintering (Kg/cm$^2$) | Relative Density (%) | Thermal Conductivity (W/mK) |
|---|---|---|---|---|---|---|
| 47 | 0.01 | 1,800 | 2 | 0 | 95 | 50 |
| 48 | 0.02 | 1,800 | 2 | 0 | 97 | 60 |
| 49 | 0.5 | 1,800 | 2 | 0 | 99 | 110 |
| 50 | 1.0 | 1,800 | 2 | 0 | 98 | 130 |
| 51 | 5.0 | 1,800 | 2 | 0 | 99 | 100 |
| 52 | 10.0 | 1,800 | 2 | 0 | 97 | 70 |
| 53 | 15.0 | 1,800 | 2 | 0 | 96 | 50 |

(Embodiment 5)

Figure 3:
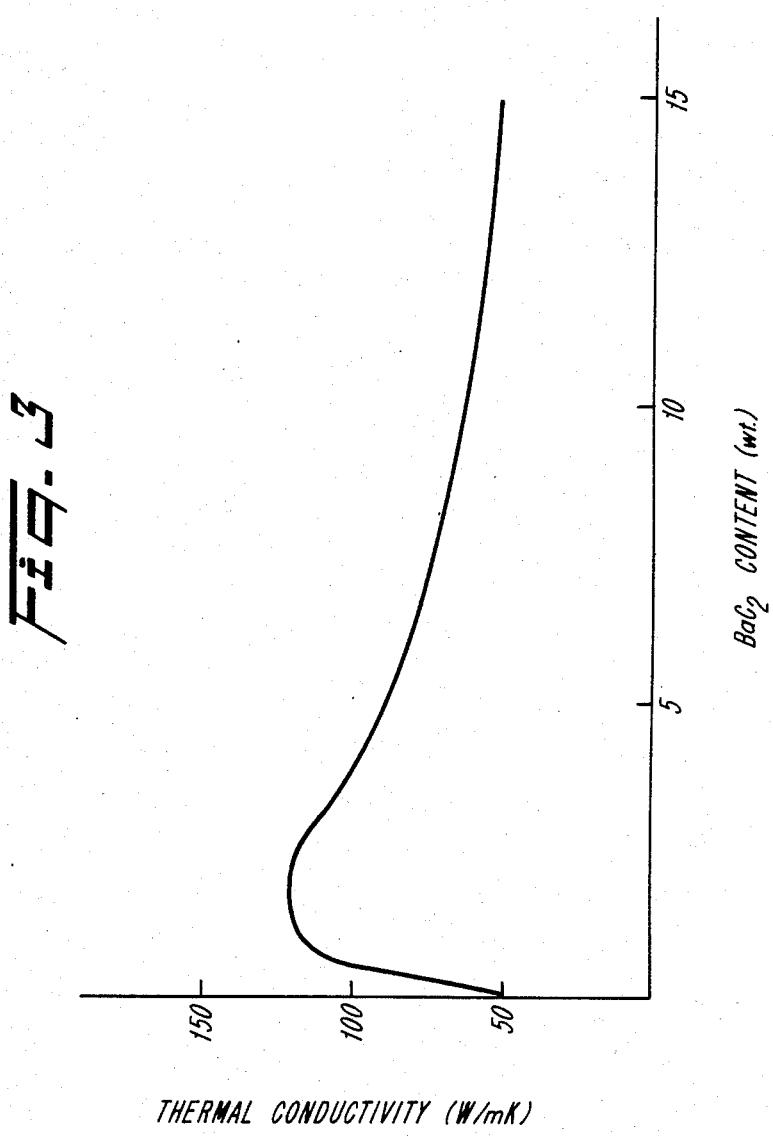
FIG. 3 is a graph showing a relationship between a content of $BaC_2$ as a sintering additive and a thermal conductivity of prepared AlN ceramics.

Barium acetylide (BaC$_2$) is mixed with aluminum nitride powder with contents from 0.01 to 15 wt %, similarly to the embodiment 3. Under the same condition as the embodiment 3, the mixtures are formed and then formed bodies are sintered to obtain aluminum nitride ceramics. The thermal conductivities at room temperature of obtained aluminum nitride ceramics are shown in Table 5 and FIG. 3. By adding BaC$_2$ with content between 0.02 and 10 wt %, the thermal conduchot press form made of carbon to sinter the body for two hours at a sintering temperature of 1,800° C., with a pressure of 200 Kg/cm$^2$ in a nitrogen atomosphere.

The obtained aluminum nitride ceramics has a relative density of 99%, a thermal conductivity of 160 W/mK, a thermal expansion coefficient of $4.3 \times 10^{-6}$ ° C., a resistivity larger than $10^{13}$ ohm-cm and a flexural strength of 50 Kg/mm$^2$ at room temperature. It has a light transparency. The transparency is about 48% for light having wave-length from 4 to 6 μm and about 20% for light having wave-length from 0.2 to 6.5 μm.

As explained in the above in detail, the aluminum nitride ceramics prepared in accordance with the present invention has a high relative density and is superior in thermal conductivity, electrical insulating property, mechanical strength, and light transparency. Therefore, the aluminum nitride ceramics prepared in accordance with the present invention is usable as materials for crucibles, evaporation apparatus and temperature-resistant jigs, in addition to heat sink materials in semiconductor devices. Furthermore, by using the property of light transparency; the aluminum nitride ceramics prepared in accordance with the present invention is also applicable to windows of various apparatus.

What is claimed is:

1. A method of preparing aluminium nitride ceramics comprising the steps of:
    mixing acetylide with aluminium nitride powder, said acetylide being an acetylide of calcium, strontium, barium, sodium, potassium, rubidium, cesium, copper, silver, magnesium, cadium, mercury, zinc, aluminium or cerium;
    forming the mixture into a predetermined shape; and
    sintering the formed body in a non-oxidizing atmosphere.

2. A method for preparing aluminum nitride ceramics as claimed in claim 1, wherein said mixture contains said acetylide with a content between 0.02 and 10 wt %.

3. A method for preparing aluminum nitride ceramics as claimed in claim 2, wherein said formed body is sintered at a temperature between 1,500° and 2,000° C.

4. A method for preparing aluminum nitride ceramics as claimed in claim 3, wherein said sintering is performed without applying a pressure to said formed body.

5. A method for preparing aluminum nitride ceramics as claimed in claim 3, wherein said sintering is performed while a pressure is applied to said formed body.

6. A method for preparing alumimum nitride ceramics as claimed in claim 4, wherein said sintering is performed once without applying pressure to the body and once while applying pressure to the body.

7. A method for preparing aluminum nitride ceramics comprising steps of:
    mixing at least one of acetylides of calcium, strontium and barium with aluminum nitride power with a content from 0.02 to 10 wt %;
    forming said mixture into a predetermined shape; and
    sintering said formed body in a non-oxidizing atomosphere at a temperature between 1,500° and 2,000° C.

8. A method for preparing aluminum nitride ceramics as claimed in claim 7, wherein said sintering temperature is between 1,600° and 1,900° C.

9. A method for preparing aluminum nitride ceramics as claimed in claim 7, wherein said non-oxidizing atomosphere in said sintering step is atomosphere of nitrogen gas, helium gas, argon gas, carbon mono-oxide gas, hydrogen gas or vacuum.

10. A method for preparing aluminum nitride ceramics as claimed in claim 9, wherein said formed body is sintered without applying a pressure.

11. A method for preparing aluminum nitride ceramics as claimed in claim 9, wherein said formed body is sintered while applying a pressure.

12. A method for preparing aluminum nitride ceramics as claimed in claim 9, wherein said formed body is sintered without applying a pressure and then resintered while applying a pressure.

* * * * *